United States Patent [19]

Fischer

[11] 4,209,197
[45] Jun. 24, 1980

[54] WEATHER PROTECTION SYSTEMS FOR ROAD VEHICLES

[76] Inventor: Moritz Fischer, Sonnhaldenstr. 19, CH-6052 Hergiswil, Switzerland, 6052

[21] Appl. No.: 856,868

[22] Filed: Dec. 2, 1977

[30] Foreign Application Priority Data

Dec. 4, 1976 [CH] Switzerland ............... 15250/76

[51] Int. Cl.² ............................................. B60J 7/00
[52] U.S. Cl. ............................ 296/216; 150/52 K; 296/95 C; 296/136
[58] Field of Search ............. 296/78 R, 81, 83, 136, 296/95 R, 95 C, 84 R, 137

[56] References Cited

U.S. PATENT DOCUMENTS

| | | | |
|---|---|---|---|
| 1,356,541 | 10/1920 | McGregor | 296/136 |
| 2,994,356 | 8/1961 | Fleming | 296/136 |
| 3,021,894 | 2/1962 | LaDue | 296/136 |
| 3,316,012 | 4/1967 | Thiea | 296/136 |

*Primary Examiner*—Richard A. Bertsch
*Attorney, Agent, or Firm*—Ernest F. Marmorek

[57] ABSTRACT

A weather protection system for a road vehicle has windows, including a wind screen pane and a rear window pane, and comprises at least two protector parts which are detachably connected to the vehicle, are composed of flexible material, extend at least over the vehicle windows, and are disposed near each other in the region of the windscreen pane and the rear window pane.

11 Claims, 8 Drawing Figures

U.S. Patent Jun. 24, 1980 Sheet 2 of 2 4,209,197
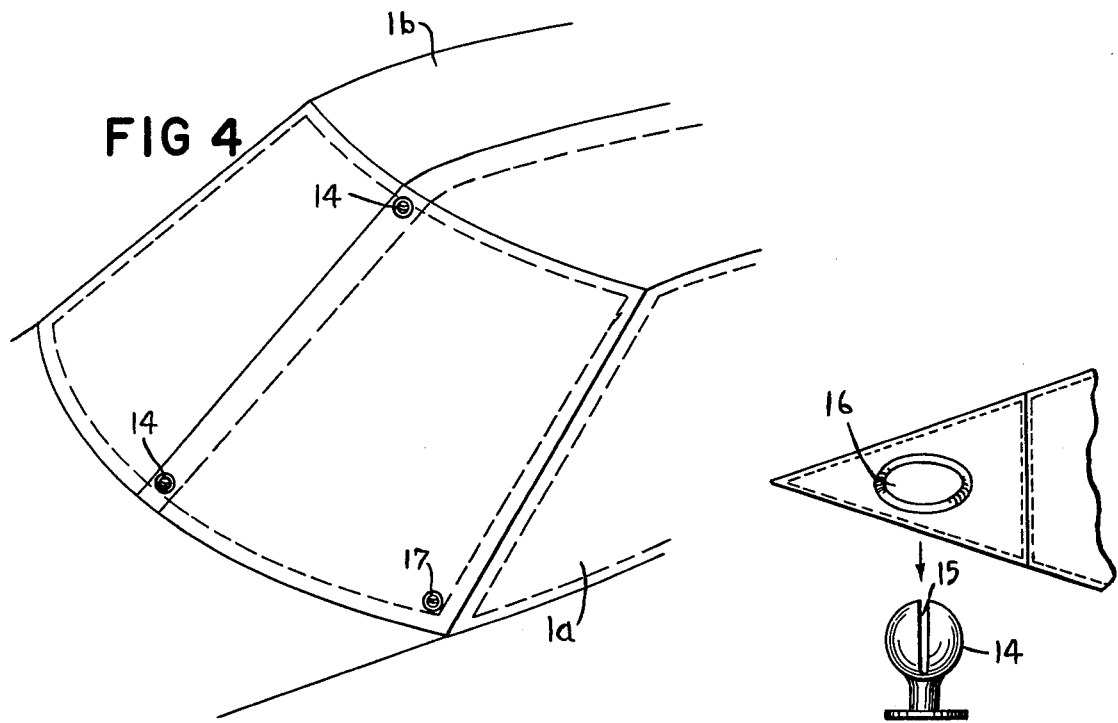
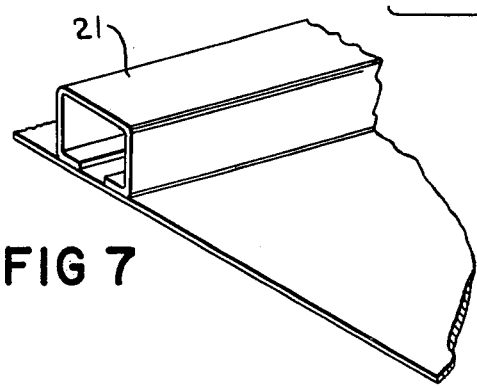
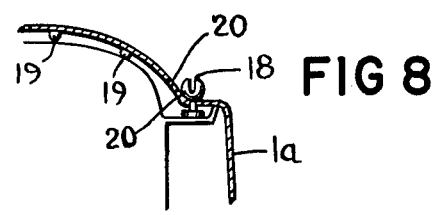
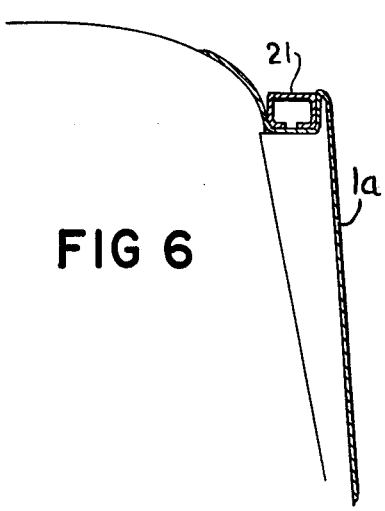

WEATHER PROTECTION SYSTEMS FOR ROAD VEHICLES

BACKGROUND OF THE INVENTION

The invention relates to a weather protection system for a road vehicle.

It is generally known that the internal temperature of road vehicles can rise to 50° C. and more due to sun radiation on sunny summer days unless the vehicle can be parked in a shady place and that on commencement of a journey the internal temperature of the vehicle can be reduced to a tolerable degree only by generating undesirable draught. It is also known that the need for removing snow and ice from the vehicle window panes prior to commencement of a journey is very unpleasant.

SUMMARY OF THE INVENTION

According to the invention, there is provided a weather protection system for a road vehicle, comprising at least two protector parts which are detachably connectable to the vehicle, consist of flexible material, extend at least over the vehicle window panes and overlap each other and/or are detachably connectable to each other in the region of the windscreen and rear window.

A protection system of this kind can be simply manufactured and installed.

To mount the protector parts on the vehicle it is convenient if they can be detachably mounted on the vehicle bodywork, on the vehicle roof and/or along the bottom edge of the vehicle window panes by means of magnets attached to the protector parts.

If the vehicle is equipped with a luggage rack or a ski rack it will be convenient, in order to keep the vehicle roof free, if the protector parts are constructed so that they can be attached to a rain gutter extending along at least the top edge of the vehicle side window panes. If the vehicle that is to be protected, for example a type S Mercedes Benz, is provided with a rain gutter extending along the top of the rear window it can also be advantageous if the protector parts are constructed so that they can be attached along the said rain gutter which extends along the top edge of the vehicle rear window pane.

It can be advantageous if the two protector parts can be detachably connected to each other in the middle region of the vehicle bodywork extending along the longitudinal axis of the vehicle, preferably by means of a barbed closure (such as a Velcro closure).

It has also been found advantageous if fastening elements, which can be detachably connected to the protector parts are attached to the top and/or bottom pane edge in the middle region thereof which extends along the longitudinal axis of the vehicle. To this end it is advantageous if fastening elements which can be detachably connected to the protector parts are additionally disposed within the rain gutters.

To permit adaptation of the protector parts to the bodywork surface it is advantageous if the protector parts consist of resiliently stretchable material or are constructed so as to be resiliently stretchable, so as to avoid the protective system no longer having a correct fit, if the vehicles are changed, and if the shapes of the bodywork regions to be protected deviate only relatively slightly from each other.

BRIEF DESCRIPTION OF THE DRAWING

The invention will be further described, by way of example, with reference to the accompanying drawings, in which:

FIG. 4 is a perspective view of part of a third preferred protective system;

FIG. 5 shows in detail in an enlarged scale a fastening means employed for the embodiment illustrated in FIG. 4;

FIG. 6 is a section through the rain gutter of a vehicle to illustrate the method of mounting the protector parts by means of a resilient clamping strip which can be pressed into the rain gutter;

FIG. 7 shows in detail in an enlarged scale and as a perspective view a clamping strip employed for the embodiment which is illustrated in FIG. 6; and FIG. 8 shows other means for mounting the protector parts in the rain gutter.

DESCRIPTION OF THE PREFERRED EMBODIMENTS

Figure 1:
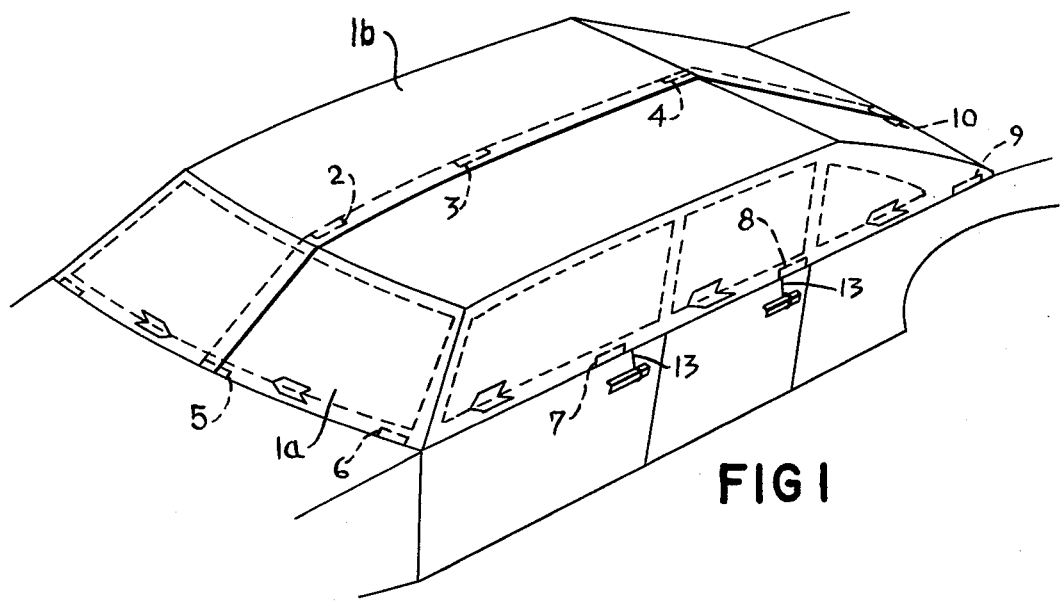
FIG. 1 is a perspective view of a first preferred protective system.

As can be seen by reference to FIG. 1 the illustrated weather protection system comprises two protector parts 1a and 1b of flexible material each of which extends over one-half of the vehicle top part in the longitudinal direction of the vehicle so that the entire vehicle top part, that is to say the vehicle roof and all vehicle window panes, are completely covered by the two protector parts 1a and 1b.

To mount the protective system on the vehicle which is to be protected, the protector part 1a is provided along its longitudinal edge extending over the vehicle roof with magnets 2, 3 and 4 of flexible material and its bottom edge is provided with flexible magnets 5 to 10 so that when covering the vehicle the protector part 1a can be secured without difficulty by a single person from one vehicle side in the correct position on the vehicle.

Figure 3:
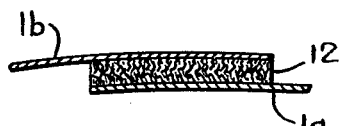
FIG. 3 is a diagrammatic section through a barbed closure.

Subsequently and from the other vehicle side the second protector part 1b can be connected firmly, but is detachable through a powerful pull by means of a barbed closure 12, shown diagrammatically in FIG. 3, and extending in strip-form along the overlapping longitudinal edges of the two protector parts 1a and 1b to the protector part 1a which is already secured on the vehicle roof and the magnets 12 etc. situated along the protector part bottom edge, by analogy the protector part 1a can be brought to bear upon the bodywork to form a securely mounted weather protection system which forms an integral unit.

It is of course also possible to secure the bottom edge of the protector parts 1a and 1b on the door handles and/or wheel apertures by means of rubber cords 13, which are provided with a hook, instead of using the magnets 5 to 10.

The material employed for the protector parts 1a and 1b is preferably water-repellent so that in winter it is not possible for any ice to freeze on this material.

It is also possible for a lead tape to be sewn along the bottom edge of the protector parts instead of providing the bottom edge of the protector parts 1a and 1b with flexible magnets.

It is also feasible for the two protector parts 1a and 1b to be made sufficiently long and to be so shaped and to be provided with magnets to enable the entire vehicle to be covered. The individual protector parts can then also comprise two or more components, which can be connected to each other, for example by means of barbed closures.

Figure 2:
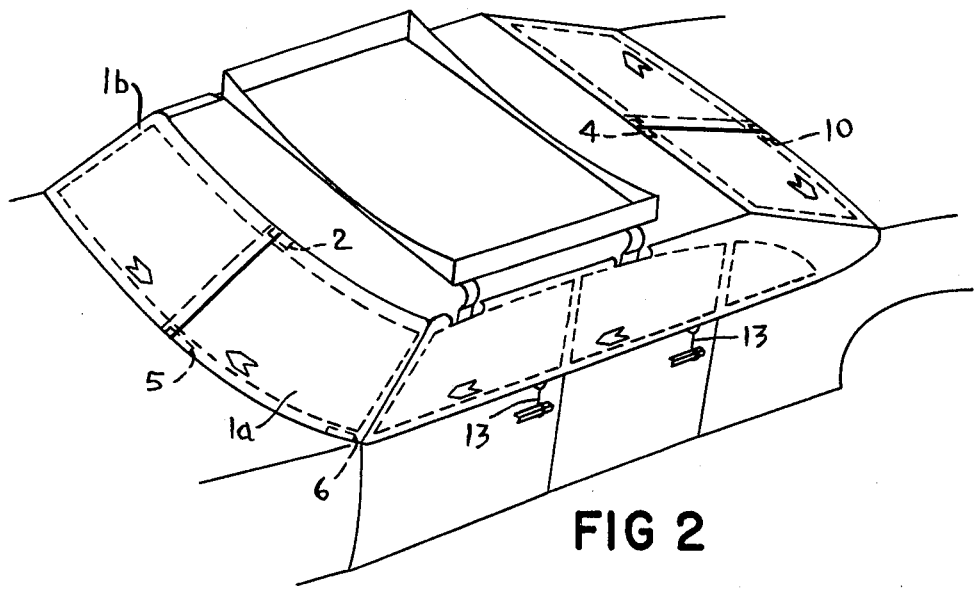
FIG. 2 is a perspective view of a second preferred protective system.

If the vehicle is provided with a luggage rack it will not be possible to employ the embodiment illustrated in FIG. 1. To this end an embodiment is proposed which is illustrated in FIG. 2, in which the protector parts 1a and 1b are engaged on the available locations of the rain gutter, and are secured on the roof by means of the sewn-in magnets 2 and 4, on the bottom edge by means of the sewn-in magnets 5, 6, 9 and 10 on the bodywork, and by means of the rubber tensioning cords 13 on the door handles.

As in the embodiment illustrated in FIG. 1, the second protector part 1b is joined to the first protector part 1a by means of a barbed closure in the region of the windscreen and rear window pane.

In the embodiment illustrated in FIG. 4, fastening nipples 14 are adhesively attached to the top and bottom pane edge of the windscreen and rear window, and have a slot 15 extending along their longitudinal orientation, so that the nipples 14 can be inserted through openings 16, which are provided in both protector parts 1a and 1b. Since the diameter of the openings 16 is slightly smaller than the external diameter of the nipple 14, which is thickened in spherical form at its end, the last-mentioned nipples will engage reliably with the openings 16.

It is of course possible for additional nipples of this kind to be provided on the bottom outer corners of the windscreen and rear window pane, as well as in the rain gutter, for example as illustrated in FIG. 4 with the nipple 17, and in FIG. 8 with the nipple 18.

In place of the nipples 14 or in addition to these nipples a clamping strip 21 of resilient material, which can be pressed into the rain gutter, can be provided as illustrated in FIGS. 6 and 7; the strip has approximately the shape of a reversed U, and is thus very flexible in the transverse orientation.

FIG. 8 also reveals that spacer ribs 19 of resilient material can be provided on the inside of the protector parts 1a and 1b, to space the protector parts from the surface of the vehicle roof in order to permit drying thereof. A plurality of covered ventilating apertures 20 are preferably provided in this embodiment.

It is convenient, if the weather protection system consists of resiliently stretchable material, or is constructed to be resiliently stretchable, so that on the one hand it is only necessary to manufacture the least number of different shapes of protector parts, and on the other hand one avoids purchase of a different weather protection system with each change of vehicle.

If the protector parts are correctly dimensioned, it is also readily possible to cover the windscreen wipers, and the external mirrors with the protective system, a feature which represents a great advantage particularly in winter.

What I claim is:

1. A weather protection system for a vehicle, wherein the vehicle has a front window pane, a rear window pane and at least two side window panes, each side window pane having a top edge, and a rain gutter extending at least along each top edge, comprising at least two protector parts, composed of flexible material and releasably connectable to one another within the region of said front window pane, and said rear window pane, and being securable to said rain gutter.

2. A weather protection system as claimed in claim 1, wherein said protector parts overlap one another within said region of said front window pane and said rear window pane.

3. A weather protection system as claimed in claim 1, wherein said rear window pane has a top edge and said rain gutter additionally extends over the top edge of said rear window pane, said protective parts being additionally securable to the top edge of said rear window pane.

4. A weather protection system according to claim 1, further comprising fastening means disposed within said rain gutter, said fastening means being releasably connectable to said protective parts.

5. A weather protection system according to claim 4, wherein the vehicle has a longitudinal axis and a center region extending along said longitudinal axis, and wherein said front window pane and said rear window pane each have a bottom edge, and further comprising additional fastening means disposed within said center region on at least one edge of one of said front window and rear window panes.

6. A weather protection system according to claim 5, wherein each protecting part has an opening, and wherein said fastening means comprise a pair of fastening nipples, each fastening nipple having a longitudinal axis and being releasably securable to another fastening nipple through one of said openings, said pair of fastening nipples being compressible along the longitudinal axis of each fastening nipple.

7. A weather protection system according to claim 1, wherein each of said protector parts is provided with a resilient clamping strip which can be pressed into said rain gutter.

8. A weather protection system according to claim 1, wherein the vehicle has a longitudinal axis and a center region extending along said longitudinal axis, and wherein said protector parts are releasably connectable to one another along said center region.

9. A weather protection system according to claim 1, wherein said protector parts are resiliently stretchable so as to fit over a surface of the vehicle.

10. A weather protection system according to claim 1, wherein the vehicle has a roof, said protector parts being extendable over said vehicle so as to leave said roof free of said protector parts.

11. The combination with
  a vehicle having a front window pane, a rear window pane, and at least two side window panes, each side window pane having a top edge and a rain gutter extending at least along each top edge, of
  a weather protection system, comprising at least two protector parts composed of flexible material and releasably connectable to one another within the region of said front window pane and said rear window pane, and being securable to said rain gutter.

* * * * *